United States Patent Office 3,462,597
Patented Aug. 19, 1969

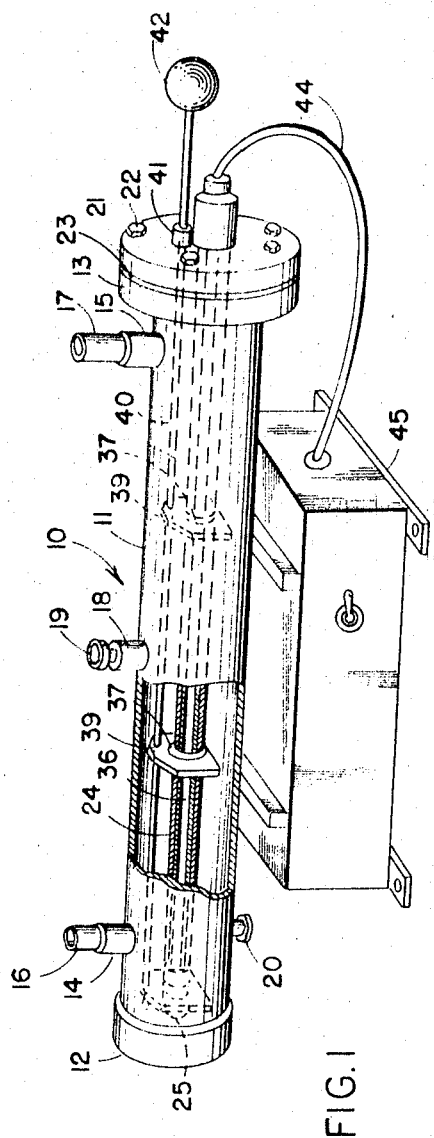

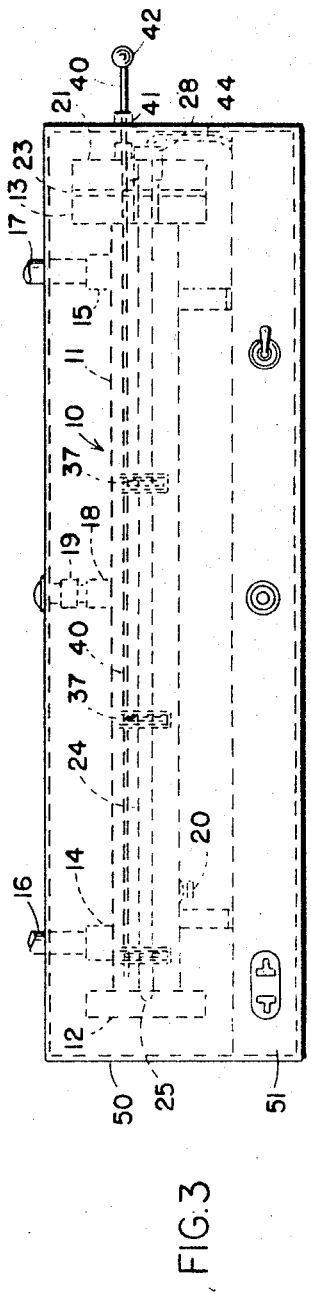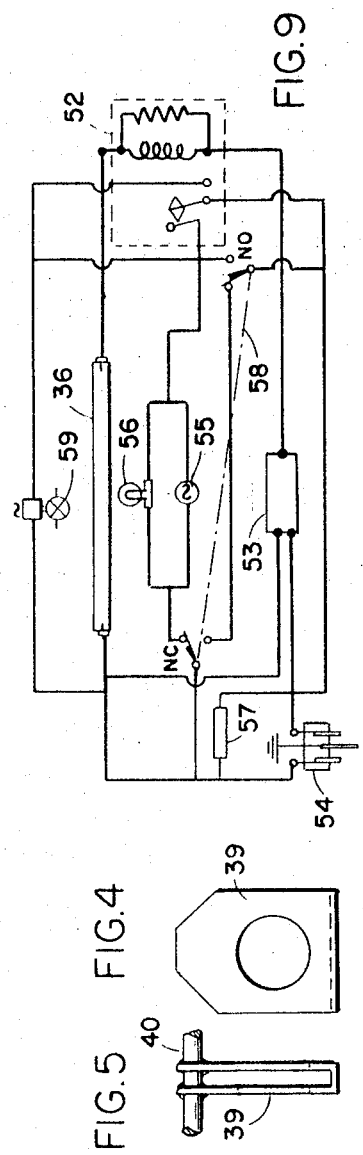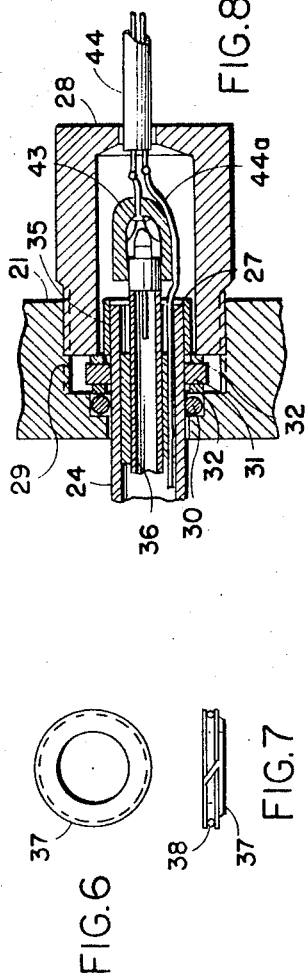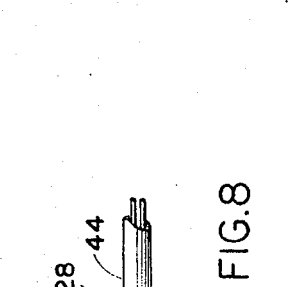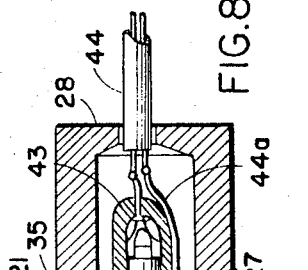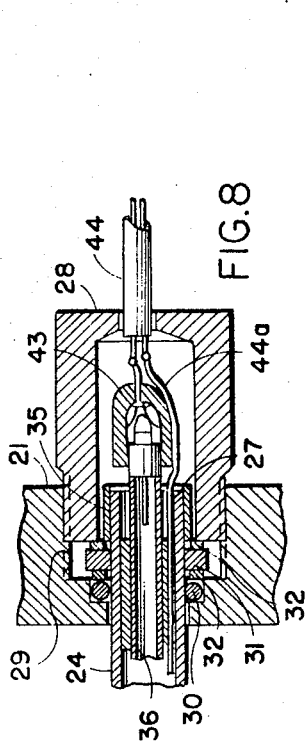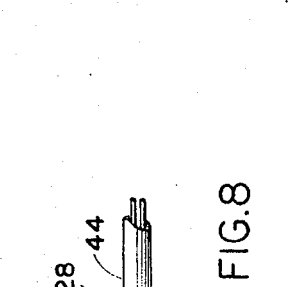
INVENTOR.
Albert Young
by Sparrow and Sparrow
ATTORNEYS.

3,462,597
ULTRAVIOLET FLUID PURIFIER HAVING MANUALLY OPERABLE WIPER MEANS
Albert Young, Sands Point, N.Y., assignor to Ultra Dynamics Corporation, a corporation of Delaware
Filed July 29, 1966, Ser. No. 572,644
Int. Cl. G01n *21/26;* H01j *37/16*
U.S. Cl. 250—43
5 Claims

ABSTRACT OF THE DISCLOSURE

A fluid purifier with a tubular body, and an ultraviolet rays emitting lamp enclosed in a quartz tube in the tubular body. A plurality of wiper rings with inserts which are unaffected by the ultraviolet rays, are arranged on the quartz tube and means for operating the rings by hand for cleaning of the outside of the tube.

---

This invention relates to fluid purifiers in general and to an ultraviolet ray water purifier and to improvements thereof in particular.

Water purifiers using the principle of irradiation by ultraviolet rays are known, but they all have more or less inconveniences due to their structure, particularly with respect to complexity of installation, maintenance and control of proper functioning. Furthermore, the efficiency of the irradiation in existing purifiers of this kind is known to be low. This invention is directed at improving these conditions; it consists in such novel features, construction arrangements, combinations of parts and improvements as may be shown and described in connection with the apparatus herein disclosed by way of example only and as illustrative of preferred embodiments. Objects and advantages of the invention will be set forth in part hereafter and in part will be obvious herefrom or may be learned by practicing the invention, the same being realized and attained by means of the instrumentalities and combinations pointed out in the appended claims.

It is an object of the present invention to provide a new kind of fluid purifier (particularly for water) operating on the principle of ultraviolet ray irradiation, having a very high purifying efficiency.

A further object of the present invention is to provide a purifier of the aforementioned kind which consists of a compact, self-contained unit.

Furthermore, it is an object of the present invention to provide a water purifier in which the source of the ultraviolet rays does not come into direct contact with the water to be purified.

Yet another object of the present invention is a new and improved structure of a fluid purifier of the aforementioned kind which permits exchanging of the source of the ultraviolet rays without dismantling the unit.

Another object of the present invention is to provide a water purifier unit which can be installed easily and in either horizontal or vertical position.

Furthermore, it is an object of the present invention to provide a new kind of water purifier which can be conveniently kept in optimum operational condition and which has means for continuous supervision.

A further object of the present invention is to provide an improved water purifier which is constructed of relatively few parts and which is safe to operate.

Yet another object of the present invention is to provide a purifier of the aforementioned kind which is operated at low cost and which is economical to manufacture and install.

Various further and more specific purposes, features and advantages will clearly appear from the detailed description given below taken in connection with the accompanying drawings which form part of this specification and illustrate merely by way of example embodiments of the device of the invention. In the following description and in the claims, parts will be identified by specific names for convenience, but such names are intended to be as generic in their application to similar parts as the art will permit. Like reference characters denote like parts in the several figures of the drawings in which:

FIG. 1 is an isometric view of fluid purifier unit, partly broken away, according to the invention;

FIG. 2 is a longitudinal section of the quartz tube and of the ultraviolet lamp therein, partly broken away, also showing schematically the electric circuit diagram for the lamp;

FIG. 3 is a front elevation of a fluid purifier unit embodying the invention with the electrical component parts within a mounting base and enclosed in a housing;

FIG. 4 is a face view of the quartz tube wiper holder;

FIG. 5 is a side view of the holder shown in FIG. 4;

FIG. 6 is a face view of the quartz tube wiper;

FIG. 7 is a side view of the wiper shown in FIG. 6;

FIG. 8 is a longitudinal section of the sealing gland of the open end of the quartz tube, as shown in FIG. 2, in a larger scale; and FIG. 9 is an electric circuit diagram of the unit shown in FIG. 3.

Referring now in more detail to the drawings illustrating preferred embodiments by which the invention may be realized, there is shown in FIG. 1 a fluid-containing purifying unit designated by the general numeral 10. The unit has a body 11, substantially consisting of a tube which can be made of stainless steel or of a suitable plastic, such as Geon, transparent butyrate or the like plastic, having ultraviolet inhibitors or a PVC Type 2 having a non-lead stabilizer, which does not deteriorate under the irradiation by the ultraviolet light. A cap 12 is welded on one end of body 11 for permanently leakproof closing body 11. A flange 13 is welded on the other end of body 11. Near cap 12 and flange 13 are pipe sockets 14 and 15 for connecting intake and outlet water pipe lines 16 and 17. A third socket 18 is arranged in the center of body 11. Socket 18 is internally threaded for receiving an inspection plug 19, preferably made of a clear plastic which protects the human eye from being damaged by the ultraviolet rays, such as "Lexon." A drain plug 20 is provided on body 11 for emptying the unit. Unit 10 is closed by a flange 21 which is bolted on flange 13 by screws 22. A sealing gasket 23 is placed between the two flanges 13 and 21.

A tube 24 made of quartz or other ultraviolet transmitting material is centrally located in body 11, extending from cap 12 up into flange 21. Quartz tube 24 is closed at one end and open at the other, similar to a test tube. The closed end 25 is received in a receptacle on cap 12. This may be a cavity 26 on the inside of cap 12 or any other suitable socket-like receptacle which may be welded on the inside of cap 12. The open end 27 of tube 24 is sealingly held in a socket 28 which is screwed into a threaded center hole 29 of flange 21, as shown in FIGS. 2 and 8. The sealing means in socket 28 consist of an O-ring 30 and a special washer 31 which is held between two stainless steel rings 32 and 33. By this construction, tube 24 is pressure-tight sealed in flange 21. In order to protect the brittle quartz tube from cracking, a rubber cup 34 is placed over closed end 25 and a corresponding rubber jacket 35 is placed over open end 27. A high-intensity ultraviolet lamp 36 is inserted into tube 24, the length of lamp 36 being such as to protrude over open end 27 of tube 24. Ultraviolet lamp 36 produces light with a peak intensity of substantially 2537 angstrom units and provides an energy dose of substantially 30,000 microwatt seconds per square centimeter at all points. Since lamp 36 does not come into contact with the fluid, such as water, to be purified, the energy loss is minimized. Furthermore, the protection of lamp 36 by tube 24 provides for maintaining the proper operating temperature of substantially 105° F. of lamp 36 for the highest possible radiation efficiency.

Since all raw water contains certain physical impurities which tend to deposit on the outside of quartz tube 24, a highly effective, yet very simple wiper system is arranged on tube 24. Wiper rings 37 made of Teflon or any other material which is not affected by the ultraviolet irradiation, are placed at certain distances spaced apart from one another. Rings 37 preferably are split and are elastically or resiliently held on the outside of tube 24 by a garter spring 38 for efficient wiping action. Rings 37 are axially held by a ring holder 39 which preferably consists of stainless steel sheet which is bent to a U-shape. Holders 39 are welded on a rod 40 at proper distances. Rod 40 extends through a Teflon-lined gland 44, pressure-proof, which is screwed into flange 21, to the outside of unit 10 and has a suitable knob 42 at its end. A simple push-pull action on knob 42 wipes tube 24 immediately clean without interrupting the flow of the water and the purifying action of lamp 36. Ring holders 39 furthermore are shaped in such manner as to provide baffles in body 11 for causing an agitation of the water through unit 10 in order to intensify the purifying action.

Conventional snap-on connectors or plugs 43a, 43b are arranged on the ends of lamp 36, and a cable 44, comprising both leads from connectors 43a, 43b (one lead 44a being connected to plug 43a and is trained through tube 24 to the other end thereof) connects lamp 36 with a small control box 45 on top of which unit 10 is mounted. Box 45 contains a special ballast transformer 46 for enabling the highest possible output from ultraviolet lamp 36 (transformer not shown in the drawing, only schematically as a "box" in FIG. 2).

While purifying unit 10 can be manually safely operated, a more automated arrangement is shown in FIG. 3. Unit 10 is enclosed in a sheet metal housing 50 which also encloses a base 51 on which unit 10 is mounted and which contains the electrical circuit elements. A circuit diagram is shown in FIG. 9. Ultraviolet lamp 36 is connected over an A.C. relay 52 to ballast transformer 53, which in turn is connected to plug 54. There are several warning circuits, one of which provides for an audible alarm 55 and for a visual warning light 56. A further warning signal comprises a lamp life indicator 57 by which the operator is informed that the output of lamp 36 is below the required level and must be replaced with a new one. An overriding switch 58 is provided for the closing of a solenoid valve 59 in case of maintenance or repair requirements.

The built-in automatic safety features operate as follows: If lamp 36 burns out or does not light, or if transformer 53 fails to work or if the line voltage drops below a certain point, warning light 56 goes on, audible alarm 55 is sounded and solenoid valve 59 shuts off the flow of water. Otherwise, the manual operation of the unit remains unchanged, as far as the wiping of tube 24 and the visual inspection of the proper functioning of lamp 36 through see-through plug 19 is concerned.

It is understood that one or more ultraviolet light transmitting envelopes, housings or tubes 24 enclosing the ultraviolet ray emitting means 36 may be used in a body 11, and that body 11 which is impervious to ultraviolet light may be either opaque, transparent or translucent.

While the invention has been described and illustrated with respect to certain preferred examples which give satisfactory results, it will be understood by those skilled in the art after understanding the principle of the invention that various other changes and modifications may be made without departing from the spirit and scope of the invention and it is intended therefore in the appended claims to cover all such changes and modifications.

I claim:

1. A fluid purifying unit having a substantially tubular body, said body have a closed cap welded to one end and having a fixed flange welded to the other end, a closing flange on said other end, said closing flange being bolted to said fixed flange, a fluid sealing gasket between said fixed flange and said closing flange, ultraviolet light transmitting means centrally located in said body, said means extending through substantially the entire length of said body and protruding over said fixed flange into said closing flange; comprising said means being closed at one end and being open at the other end; a retaining socket threaded in said closing flange for said open end of said means, a cup-shaped cavity in said cap for receiving said closed end of said means and a resilient cup on said closed end fitted in said cavity, pressure-tight sealing means for said open end of said means in said socket, said pressure-tight sealing means comprising an O ring sealed within a recess in said closing flange, a washer spaced from said O ring through a first abutting ring member interposed between said O-ring and said washer, and a second abutting ring member interposed between said washer and said retaining socket, high-intensity ultraviolet ray emitting means inserted in said ultraviolet light transmitting means through said open end thereof, a plurality of wiper rings spaced apart from one another on said ultraviolet light transmitting means, and manually operable means for operating said plurality of rings in unison longitudinally of said ultraviolet light transmitting means.

2. A fluid purifying unit according to claim 1, and wherein said wiper rings comprise Teflon.

3. A fluid purifying unit according to claim 1, and wherein said wiper rings consist of inorganic, low-friction, ultraviolet irradiation resisting material.

4. A fluid purifying unit according to claim 1, and having baffles, each baffle holding a wiper ring.

5. A fluid purifying unit according to claim 4, said baffle consisting of U-shaped non-corrosive metal.

References Cited

UNITED STATES PATENTS 2,670,439  2/1954  Darney _____ 250—43
3,182,191  5/1965  McFarland _____ 250—43

RALPH G. NILSON, Primary Examiner

A. L. BIRCH, Assistant Examiner

U.S. Cl. X.R.

21—102; 250—46